US011325197B2

(12) United States Patent
Franchini

(10) Patent No.: US 11,325,197 B2
(45) Date of Patent: May 10, 2022

(54) TOOL HOLDER DEVICE FOR BROACHING AND SLOTTING

(71) Applicant: REV S.R.L. UNIPERSONALE, Soliera (IT)

(72) Inventor: Paolo Franchini, Soliera (IT)

(73) Assignee: Rev S.r.l. Unipersonale, Soliera (IT)

( * ) Notice: Subject to any disclaimer, the term of this patent is extended or adjusted under 35 U.S.C. 154(b) by 178 days.

(21) Appl. No.: 16/611,824

(22) PCT Filed: May 9, 2018

(86) PCT No.: PCT/IB2018/053227
§ 371 (c)(1),
(2) Date: Nov. 7, 2019

(87) PCT Pub. No.: WO2018/207117
PCT Pub. Date: Nov. 15, 2018

(65) Prior Publication Data
US 2020/0164448 A1    May 28, 2020

(30) Foreign Application Priority Data
May 10, 2017   (IT) .................. 102017000050842

(51) Int. Cl.
*B23D 11/00*   (2006.01)
*B23D 13/00*   (2006.01)
(Continued)

(52) U.S. Cl.
CPC ............ *B23D 11/00* (2013.01); *B23D 1/26* (2013.01); *B23D 13/00* (2013.01); *B23D 41/04* (2013.01);
(Continued)

(58) Field of Classification Search
CPC . B23D 11/00; B23D 5/00; B23D 5/02; B23D 13/02; B23D 41/04;
(Continued)

(56) References Cited

U.S. PATENT DOCUMENTS 550,004 A  *  11/1895  Morton et al. ......... B23D 11/00
                                                        409/332
2,392,747 A    1/1946  Lapointe
(Continued)

FOREIGN PATENT DOCUMENTS

DE          361292 C      10/1922
DE         1167625 B  *   4/1964
(Continued)

OTHER PUBLICATIONS

Machine Translation of DE 1167625 B, which DE '625 was published Apr. 1964.*
(Continued)

*Primary Examiner* — Erica E Cadugan
(74) *Attorney, Agent, or Firm* — David B. Tingey; Bryant J. Keller; Kirton McConkie

(57) ABSTRACT

The tool holder device for broaching and slotting, comprising: one main frame associated with one machine adapted to machine one workpiece; one working assembly associated with the main frame and comprising one supporting bar movable longitudinally along a first axis and a guiding mechanism for the supporting bar movable longitudinally along the first axis; one tool associated with the supporting bar and adapted to machine the workpiece; angular adjustment mechanism for adjusting the supporting bar, interposed between the main frame and the guiding mechanism and adapted to rotate the supporting bar around a second axis substantially orthogonal with respect to the first axis; and straight adjustment mechanism for adjusting the tool with
(Continued)

respect to the supporting bar, interposed between the tool and the supporting bar, the straight adjustment mechanism being adapted to adjust the position of the tool along the second axis.

16 Claims, 6 Drawing Sheets

(51) Int. Cl.
    *B23D 41/04*     (2006.01)
    *B23D 1/26*     (2006.01)
    *B23B 11/00*     (2006.01)
    *B23B 3/16*     (2006.01)

(52) U.S. Cl.
    CPC ............ *B23B 3/162* (2013.01); *Y10T 29/5114* (2015.01); *Y10T 409/4028* (2015.01); *Y10T 409/4077* (2015.01); *Y10T 409/502624* (2015.01); *Y10T 409/509348* (2015.01)

(58) Field of Classification Search
    CPC .......... B23D 1/00–13/06; B23D 37/00–43/08; Y10T 409/40–50984
    USPC .................................................. 409/243–348
    See application file for complete search history.

(56) References Cited

U.S. PATENT DOCUMENTS

| | | | |
|---|---|---|---|
| 2,431,343 A | 11/1947 | Pisarelli | |
| 2015/0132077 A1* | 5/2015 | Fautz | ...................... B23D 3/02 409/259 |

FOREIGN PATENT DOCUMENTS

| | | |
|---|---|---|
| DE | 1266108 B | 4/1968 |
| DE | 202014006383 U1 | 8/2014 |
| DE | 102013218507 A1 | 3/2015 |
| EP | 2402099 A1 * | 1/2012 |

OTHER PUBLICATIONS

Machine Translation of EP 2402099-A1, which DE '099 was published Jan. 2012.*

* cited by examiner

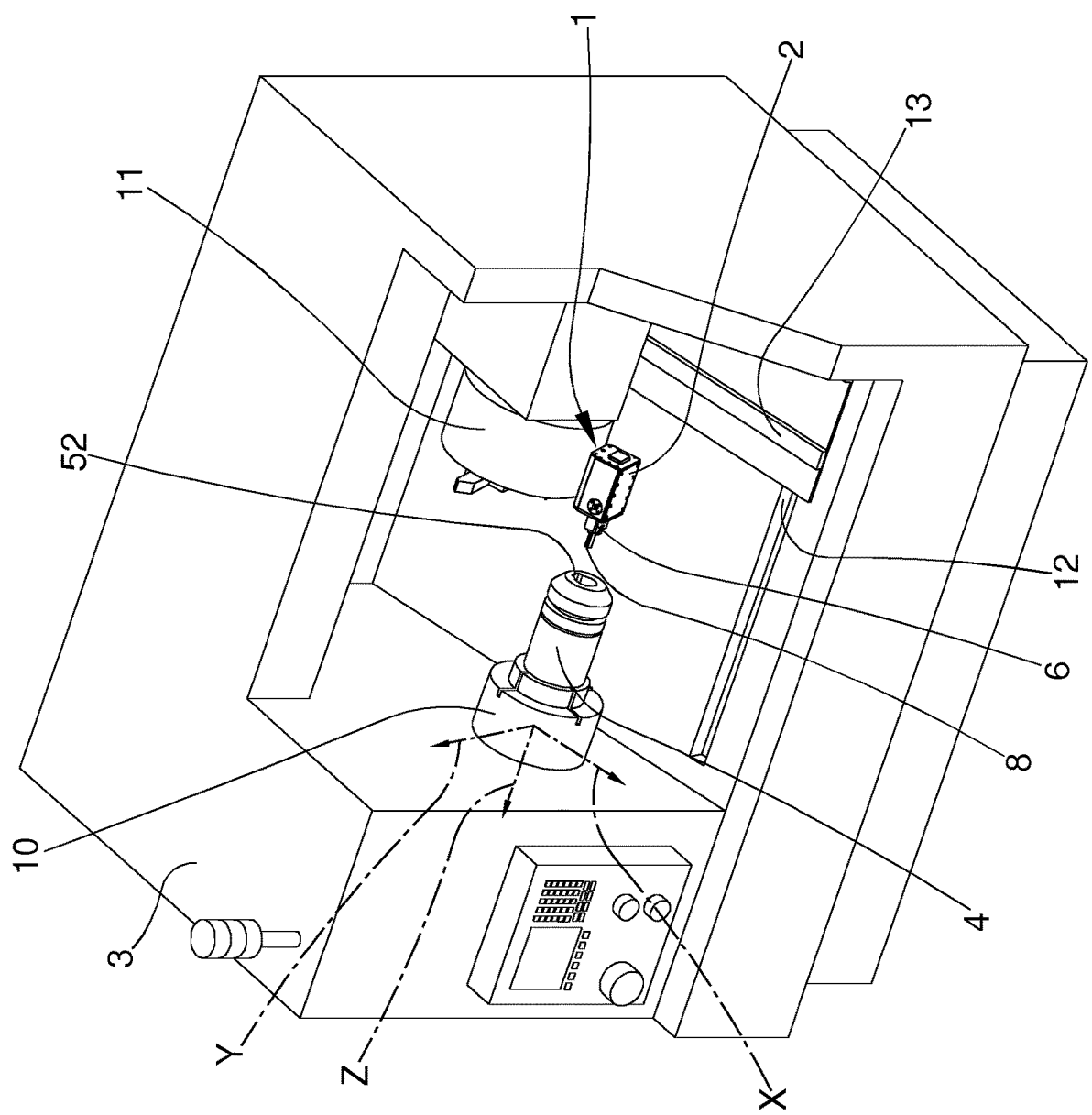

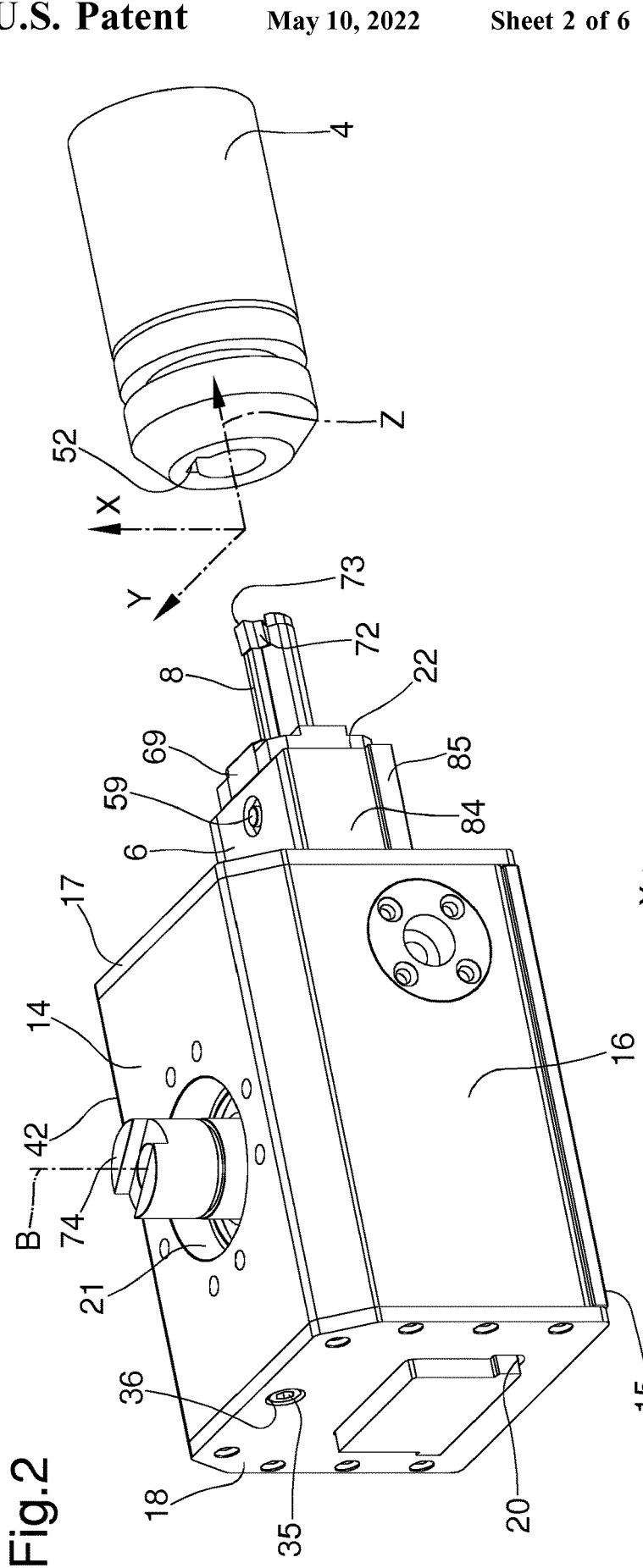

TOOL HOLDER DEVICE FOR BROACHING AND SLOTTING

TECHNICAL FIELD

The present invention relates to a tool holder device for broaching and slotting.

BACKGROUND ART

With particular but not sole reference to the technical mechanical engineering sector, the use of automated machine tools is known for machining large varieties of workpieces intended for different industrial fields.

A particular type of automated machine tool consists of the CNC (computer numerical control) lathe, which comprises a rotating workpiece pick-up spindle and a turret on which a number of tools are installed, depending on the characteristics of the workpiece to be made.

Each tool in turn stands out in terms of shape, size and the type of machining operation performed on the body of the workpiece to be machined.

This way, the entire working process for the completion of the workpiece can be completed using a single multi-tool machine.

In fact, known machines are able to perform both turning operations and broaching and slotting operations, allowing machining operations which are both symmetrical along the radial direction of the workpiece to be machined, such as cylindrical or conical profiles, and asymmetrical along the axial direction of the workpiece to be machined, such as keyways.

Specifically, during broaching and slotting operations, the known machines keep the workpiece to be machined in a fixed position while using specific tools to make, for example, one or more keyways on the inner wall of a hollow shaft.

Generally, these tools make use of moving arms which have to be kept perfectly in line with the workpiece to be machined to ensure they fall within the tolerance parameters provided in the field of mechanical engineering of this kind.

In fact, tools of known type use mechanical calibration systems to correct machining errors found after, for example, shocks and/or long machining operations that can cause a deviation of the working axis from the optimal one.

This way, due to small deviations of the working axis, the calibration system allows correcting the errors by acting only on the tool without intervening on the calibration systems of the entire machine, which generally require prolonged production down times.

This type of known tool is not without drawbacks related to the accuracy of the mechanical calibration system.

Generally, the calibration system used makes use of an eccentric bushing to perform the tool work axis repositioning operation.

During this operation, the eccentric bushing allows repositioning the work axis, which occurs through a semicircular movement of the bushing and which does not always ensure an easy, precise and fast correction of the error.

Furthermore, the eccentric bushing allows correcting shifting translation errors in the work axis while it is unable to correct inclination errors in the longitudinal work axis of the tool.

DESCRIPTION OF THE INVENTION

The main aim of the present invention is to provide a tool holder device for broaching and slotting which allows correcting quickly and easily both shifting translation errors and inclination errors of the working axis.

Another object of the present invention is to provide a tool holder device for broaching and slotting which allows overcoming the aforementioned drawbacks of the prior art in the field of a simple, rational, easy, effective to use and low cost solution.

The aforementioned objects are achieved by the present tool holder device for broaching and slotting.

BRIEF DESCRIPTION OF THE DRAWINGS

Other characteristics and advantages of the present invention will become clearer from the description of the following preferred but not exclusive embodiments of a tool holder device for broaching and slotting, illustrated by way of non-limiting example in the accompanying drawings, wherein:

FIG. 1 is an axonometric view of a machine on which the device according to the invention is mounted;

FIG. 2 is an axonometric view of the device according to the invention;

FIG. 3 is a front view of the workpiece machined by the device according to the invention;

FIG. 4 is a sectional view of the workpiece machined by the device according to the invention;

EMBODIMENTS OF THE INVENTION

Figure 5:
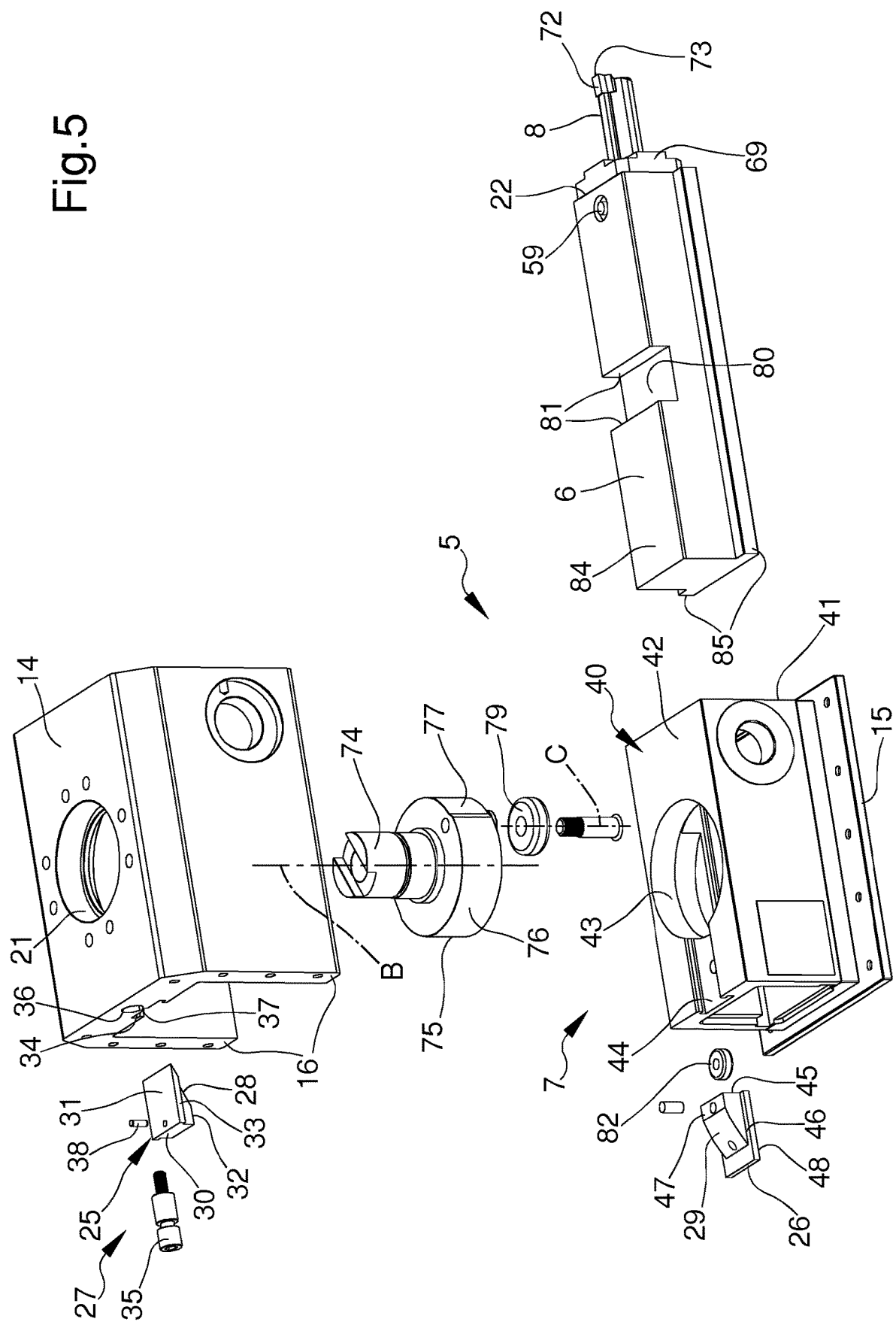
FIG. 5 is an exploded view of the device according to the invention.
Figure 6:
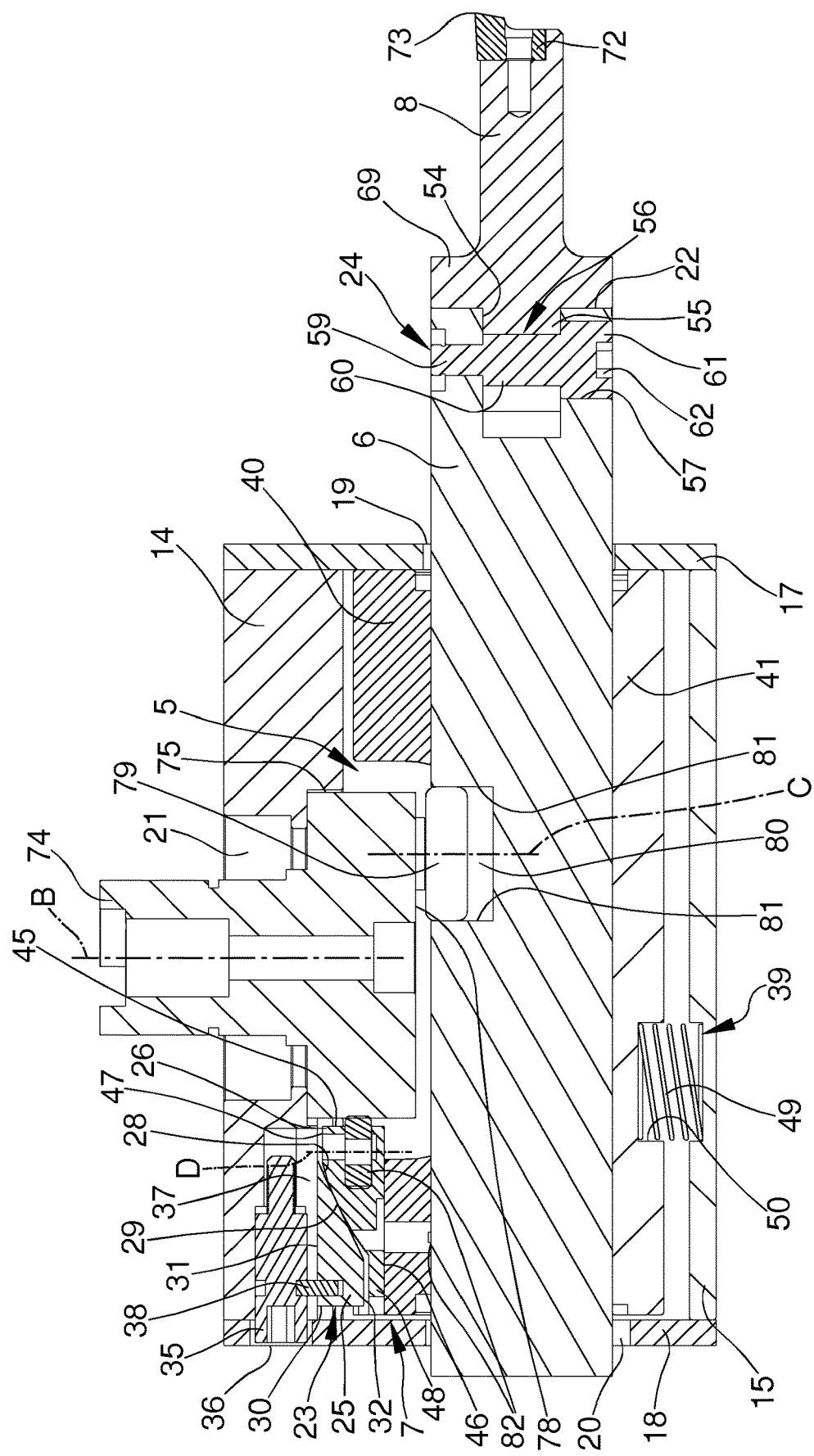
FIG. 6 is a sectional view of the device according to the invention.

With particular reference to these figures, reference numeral 1 globally indicates a tool holder device for broaching and slotting.

The device 1 comprises:
- at least one main frame 2 associated with at least one machine 3 adapted to machine at least one workpiece 4;
- at least one working assembly 5 associated with the main frame 2 and comprising at least one supporting bar 6 movable longitudinally along a first axis Z and guiding means 7 of the supporting bar 6 movable longitudinally along the first axis Z;
- at least one tool 8 associated with the supporting bar 6 and adapted to machine the workpiece 4.

The machine 3 is a CNC lathe comprising a tool holder turret 11 and a spindle 10 for clamping and setting the workpiece 4 in rotation.

Furthermore, the machine 3 comprises a first positioning guide 12 of the tool holder turret 11 longitudinally along an axial work axis substantially parallel to the first axis Z and a second positioning guide 13 of the tool holder turret 11 longitudinally along a radial work axis substantially orthogonal to the axial work axis.

Specifically, the main frame 2 is associated with the tool holder turret 11, has an at least partially box-shaped conformation and contains the working assembly 5.

The main frame 2 is e.g. a container with a substantially rectangular section comprising an upper wall 14, a lower wall 15, substantially opposite and parallel to the upper wall 14, and two lateral walls 16 associated substantially orthogonal to the upper wall 14 and to the lower wall 15 and substantially opposite and parallel to each other.

Within the scope of the present treatise, the terms "upper", "lower", and the adjectives "front" and "rear", used with reference to the device 1, should be deemed referred to the conditions shown in FIG. 2, i.e. those in which the device 1 appears arranged resting on a horizontal plane on the lower wall 15 and wherein the workpiece 4 is arranged in front of the device 1.

It is understood, however, that in use the device 1 and the workpiece 4 can have any spatial arrangement useful for performing the machining operations on the workpiece 4 itself.

The main frame 2 also comprises a front base 17 and a rear base 18 substantially rectangular and of substantially identical shape and size, associated substantially orthogonal to the upper wall 14, to the lower wall 15 and to the lateral walls 16 and substantially opposite and parallel to each other to form a substantially closed container.

Furthermore, the main frame 2 comprises a front hole 19, obtained substantially at the center of the front base 17 and centered substantially orthogonally to the first axis Z, and a rear hole 20, obtained substantially at the center of the rear base 18 and substantially identical to the front hole 19.

Moreover, the main frame 2 is provided with an upper hole 21 of substantially circular shape and obtained substantially at the center of the upper wall 14.

Preferably, the supporting bar 6 consists of an elongated body and comprises a longitudinal portion 84 with a section substantially rectangular in shape and two longitudinal projections 85 with a section substantially rectangular in shape and associated laterally along the entire length of the longitudinal portion 84.

The longitudinal projections 85 have a section substantially smaller than the longitudinal portion 84 and are arranged substantially parallel and opposite each other to define a lower flat surface with the longitudinal portion 84.

In other words, the longitudinal portion 84 together with the longitudinal projections 85 define the section of the supporting bar 6 which is substantially T shaped as shown in FIG. 2.

The supporting bar 6 passes the main frame 2 from side to side coming out through the front hole 19 and the rear hole 20.

In fact, the front hole 19 and the rear hole 20 are complementary in shape to the section of the supporting bar 6.

Furthermore, the shape of the front hole 19 and the shape of the rear hole 20 are larger in size than the section of the supporting bar 6.

Specifically, the supporting bar 6 comprises a front face 22 substantially orthogonal to the first axis Z and facing towards the workpiece 4.

The tool 8 is associated with the front face 22 of the supporting bar 6.

The device 1 comprises at least one of:
angular adjustment means 23 for adjusting the supporting bar 6, interposed between the main frame 2 and the guiding means 7 and adapted to rotate the supporting bar 6 around a second axis Y substantially orthogonal with respect to the first axis Z; and
straight adjustment means 24 for adjusting the tool 8 with respect to the supporting bar 6, interposed between the tool 8 and the supporting bar 6, the straight adjustment means 24 being adapted to adjust the position of the tool 8 along the second axis Y.

The angular adjustment means 23 comprise:
at least one pair of wedges 25, 26 coupled to each other, of which a first wedge 25 is associated with the main frame 2 and of which a second wedge 26 is associated with the guiding means 7; and
movement means 27 of the wedges 25, 26 adapted to push at least one of the wedges 25, 26 against the other of the wedges 25, 26 to tilt the supporting bar 6 around the second axis Y along a positive direction of rotation.

By the term "coupled" referred to the first wedge 25 and to the second wedge 26 it is meant to indicate the mutual position between the first wedge 25 and the second wedge 26 inside the device 1.

In fact, the first wedge 25 and the second wedge 26 have a substantially trapezoidal section and comprise a first inclined face 28 and a second inclined face 29 respectively.

Moreover, the first inclined face 28 and the second inclined face 29 are arranged facing each other.

The first wedge 25 also comprises a first straight face 30 substantially opposite the first inclined face 28, a first major base face 31 and a first minor base face 32 substantially parallel to each other, substantially rectangular in shape and interposed between the first straight face 30 and the first inclined face 28.

More specifically, the first minor base face 32 and the first major base face 31 are contiguous and substantially orthogonal to the first straight face 30 to form the wedge shape.

Furthermore, the first wedge 25 comprises a flat first board 33, associated with the first major base face 31, with a substantially rectangular section and dimensions substantially larger than the dimensions of the first major base face 31.

Specifically, the first board 33 is coupled in a prismatic manner to the main frame 2 to allow the movement of the first wedge 25 with respect to the main frame 2 and to allow the first wedge 25 to press against the second wedge 26.

In fact, the main frame 2 comprises a first prismatic guide 34 formed inside the upper wall 14 and in which the first board 33 of the first wedge 25 is inserted in a prismatic manner.

More specifically, the first prismatic guide 34 is excavated from the rear base 18 and extends along the upper wall 14 following a direction substantially parallel to the first axis Z.

This way, the first wedge 25 is inserted inside the upper wall 14 of the main frame 2, is mobile through the movement means 27 along the first prismatic guide 34 and is arranged with the first inclined face 28 substantially facing the front base 17.

The movement means 27 comprise a threaded pin 35 screwable to the main frame 2, the threaded pin 35 being associated with the first wedge 25.

In fact, the main frame 2 comprises a circular screwing seat 36 for the threaded pin 35 and obtained substantially parallel to the first prismatic guide 34 inside the upper wall 14.

Furthermore, the main frame 2 comprises a communication channel 37 obtained inside the upper wall 14 interposed between the screwing seat 36 and the first prismatic guide 34.

More specifically, the threaded pin 35 is provided with a pin 38 passing through the communication channel 37 substantially orthogonal to the first axis Z to fit into the first board 33 of the first wedge 25 inserted inside the first prismatic guide 34.

Furthermore, the angular adjustment means 23 comprise at least one balancing assembly 39 of the working assembly 5 interposed between the main frame 2 and the guiding means 7.

The balancing assembly 39 is adapted to tilt the supporting bar 6 around the second axis Y along a negative direction of rotation opposite to the positive direction of rotation.

Specifically, the balancing assembly 39 is interposed between the guiding means 7 and the lower wall 15 of the main frame 2.

The guiding means 7 comprise at least one sleeve 40 fitting in a prismatic manner around the supporting bar 6, the second wedge 26 being associated with the sleeve 40 and the balancing assembly 39 being interposed between the sleeve 40 and the main frame 2.

The sleeve 40 is substantially a tube structure with a substantially rectangular section and contained within the main frame 2.

Furthermore, the sleeve 40 comprises a bottom wall 41 substantially opposite and parallel to the lower wall 15 of the main frame 2 and a cover 42 substantially opposite the upper wall 14 and associated with the bottom wall 41 to form a sliding guide for the supporting bar 6.

Specifically, the guiding means 7 comprise an upper opening 43 formed on the cover 42 and made substantially facing the upper hole 21 formed on the upper wall 14 of the main frame 2.

Moreover, the guiding means 7 comprise a second prismatic guide 44 formed on the cover 42 of the sleeve 40 and having a substantially identical shape to the first prismatic guide 34.

The second prismatic guide 44 is arranged substantially opposite and parallel to the first prismatic guide 34 and is adapted to guide the second wedge 26.

In fact, the second wedge 26 is associated in a prismatic manner with the guiding means 7 to allow movement of the second wedge 26 with respect to the guiding means 7.

Similarly as described for the first wedge 25, the second wedge 26 comprises a second straight face 45 substantially opposite the second inclined face 29, a second major base face 46 and a second minor base face 47 substantially parallel to each other, substantially rectangular in shape and interposed between the second straight face 45 and the second inclined face 29.

More specifically, the second minor base face 47 and the second major base face 46 are associated substantially orthogonal to the second straight face 45 to form the wedge shape.

Furthermore, the second wedge 26 comprises a flat second board 48, associated with the second major base face 46 and with a section substantially greater than the second major base face 46.

In fact, the second board 48 is inserted in a prismatic manner on the cover 42 to allow the movement of the second wedge 26 with respect to the sleeve 40 and to allow the second wedge 26 to press against the first wedge 25.

In particular, the second board 48 is inserted inside the second prismatic guide 44 and is arranged with the second inclined face 29 substantially facing the rear base 18 of the main frame 2.

This way, the first inclined face 28 of the first wedge 25 and the second inclined face 29 of the second wedge 26 are facing each other and interposed between the main frame 2 and the sleeve 40 to allow the inclination of the latter in the positive direction of rotation.

On the contrary, the balancing assembly 39 is interposed between the sleeve 40 and the lower wall 15 of the main frame 2 to allow the inclination of the sleeve 40 in the negative direction of rotation.

In fact, the balancing assembly 39 comprises at least one elastic element 49 interposed between the main frame 2 and the sleeve 40 and pre-charged to tilt the sleeve 40 into the negative direction of rotation.

More specifically, the device 1 comprises a plurality of circular seats 50 arranged in the proximity of the rear base 18 of the main frame 2, three of which are obtained on the lower wall 15 inside the main frame 2 while the other three are obtained on the bottom wall 41 of the sleeve 40 substantially opposite and parallel to the first three.

Furthermore, the balancing assembly 39 comprises three elastic elements 49 which in this case are three springs arranged substantially parallel to each other and substantially orthogonal to the first axis Z and to the second axis Y.

In fact, each elastic element 49 is provided with a pair of extremes substantially opposite each other and blocked inside two circular seats 50 opposite each other to maintain the elastic element 49 fixed between the sleeve 40 and the lower wall 15 of the main frame 2.

This way, the pair of wedges 25, 26 and the elastic elements 49 are configured to act on the sleeve 40 and to cooperate to incline the first axis Z in the positive direction or in the negative direction.

In particular, to adjust the angle of the first axis Z, the threaded pin 35 must be screwed up or unscrewed inside the screwing seat 36.

This way, the first wedge 25 moves inside the first prismatic guide 34 towards or away from the second wedge 26.

In fact, if the threaded pin 35 is screwed up, the first inclined face 28 of the first wedge 25 presses against the second inclined face 29 of the second wedge 26, which in turn is constrained inside the second prismatic guide 44.

In this position, the second inclined face of the second wedge 26 is forced to slide along the first inclined face 28 of the first wedge 25 to slide substantially towards the lower wall 15 of the main frame 2.

Moreover, the second wedge 26 pushes the sleeve 40, which rotates substantially around the second axis Y towards the lower wall 15 to compress the elastic elements 49.

This way, the supporting bar 6, which is constrained to the sleeve 40, is rotated to incline the first axis Z in the positive direction of rotation.

Otherwise, if it is necessary to correct the inclination of the first axis Z in the negative direction of rotation, the threaded pin 35 must be released from the screwing seat 36.

This way, the first wedge 25 moves inside the first prismatic guide 34 away from the second wedge 26 and reduces the load acting on the elastic elements 49 which keeps the sleeve 40 inclined.

In fact, the elastic elements 49 discharge at least in part their elastic energy and extend to push the sleeve 40 closer to the upper wall 14 of the main frame 2 while keeping the second wedge 26 in contact with the first wedge 25.

The supporting bar 6 follows the rotation of the sleeve 40 and tilts the first axis Z in the negative direction of rotation.

In summary, the degree of inclination of the first axis Z is determined by the position of the first wedge 25 inside the first prismatic guide 34.

In fact, the greater the screwing of the threaded pin 35 inside the screwing seat 36 the greater the inclination of the first axis Z in the positive direction of rotation.

Vice versa, the smaller the screwing of the threaded pin 35 inside the screwing seat 36 the greater the inclination of the first axis Z in the negative direction.

With particular reference to the FIG. 4, the angular adjustment of the first axis Z is performed by unscrewing the threaded pin 35 to rotate the first axis Z around the second axis Y by a correction angle 51 to correct an inclination error when making the keyway 52.

As already specified above, it is assumed that the first axis Z is arranged substantially orthogonal to the front base 17 and to the rear base 18 of the main frame 2 and that the inclination error in making the keyway 52 is substantially due to causes external to the device 1.

In FIG. 4, the correction angle 51 is intentionally represented with a disproportionate amplitude compared to the real case for the purpose of making clear the operation of the angular adjustment means 23.

In actual fact, the maximum correction angle 51 is equal to 0.5° in the positive direction of rotation and 0.5° in the negative direction of rotation.

The straight adjustment means 24 comprise:
at least one housing 53 formed on the supporting bar 6 and comprising a pair of straight guiding edges 54 substantially parallel to each other and parallel to the second axis Y;
at least one sliding body 55 to be accommodated inside the housing 53 and guided in contact with the pair of straight guiding edges 54 to slide along the second axis Y, the sliding body 55 being associated with the tool 8;
activation means 56 of the sliding of the sliding body 55 which are interposed between the supporting bar 6 and the tool 8, the activation means 56 activating the sliding of the tool 8 along the second axis Y.

The activation means 56 comprise:
at least one eccentric body 57, rotating around an axis of adjustment A substantially orthogonal to the first axis Z and to the second axis Y, the eccentric body 57 being accommodated inside the housing 53;
at least one fork 58 formed on the sliding body 55 and inserted inside the housing 53 astride of the eccentric body 57, the rotation of the eccentric body 57 around the axis of adjustment A being adapted to cause the fork 58, the sliding body 55 and the tool 8 to slide along the second axis Y.

The eccentric body 57 comprises a centered portion 59 with circular section, the geometric center of which lies along the axis of adjustment A, and an off-center portion 60 with circular section, associated with the centered portion 59 and the geometric center of which is shifted with respect to the axis of adjustment A.

More specifically, the centered portion 59 is hinged idle to the supporting bar 6 crossing it from side to side and comprises a lower face 61 exposed to the outside of the body of the supporting bar 6.

Furthermore, the lower face 61 comprises a hexagonal recess 62 rotatable using an Allen key to adjust the position of the tool 8 with respect to the second axis Y.

The housing 53 is provided with a mouth 63 with a substantially rectangular shape comprising the two straight guiding edges 54 and two end-of-stroke edges 64 associated substantially orthogonal to the straight guiding edges 54.

Furthermore, the sliding body 55 is substantially rectangular in shape, inserted inside the housing 53 substantially in contact with both straight guiding edges 54, but spaced apart from the end-of-stroke edges 64, and having the fork 58 astride of the off-center portion 60 of the eccentric body 57 to form a cam mechanism for the displacement of the tool 8 along the second axis Y.

More specifically, the fork 58 has an internal curvature radius substantially identical to the radius of the off-center portion 60 of the eccentric body 57.

Furthermore, the straight adjustment means 24 comprise temporary fixing means 65 of the tool 8 onto the supporting bar 6.

The temporary fixing means 65 comprise:
at least one threaded seat 66 formed on the supporting bar 6;
at least one slot 67 formed passing through the tool 8 and at least partly elongated along the second axis Y;
at least one threaded stem 68 screwable inside the threaded seat 66 through the slot 67.

More specifically, the temporary fixing means 65 comprise four circular threaded seats 66 obtained on the front face 22 of the supporting bar 6 in the proximity of the mouth 63 of the housing 53.

The tool 8 comprises a flat abutment portion 69 next to the front face 22, on which are obtained four slots 67 at the four threaded seats 66.

The slots 67 comprise a pair of straight sides 70 substantially parallel to each other and to the second axis Y.

Specifically, the measurement of the distance between the pair of straight sides 70 substantially coincides with the measurement of the diameter of the threaded seats 66.

Advantageously, inside each threaded seat 66 is screwed a threaded stem 68 which in this case is a clamping screw for clamping the flat abutment portion 69 to the front face 22 to fix the tool 8 to the supporting bar 6.

Moreover, the tool 8 comprises at least one cavity 71 in which at least one machining insert 72 of the workpiece 4 is accommodated.

Figure 7:
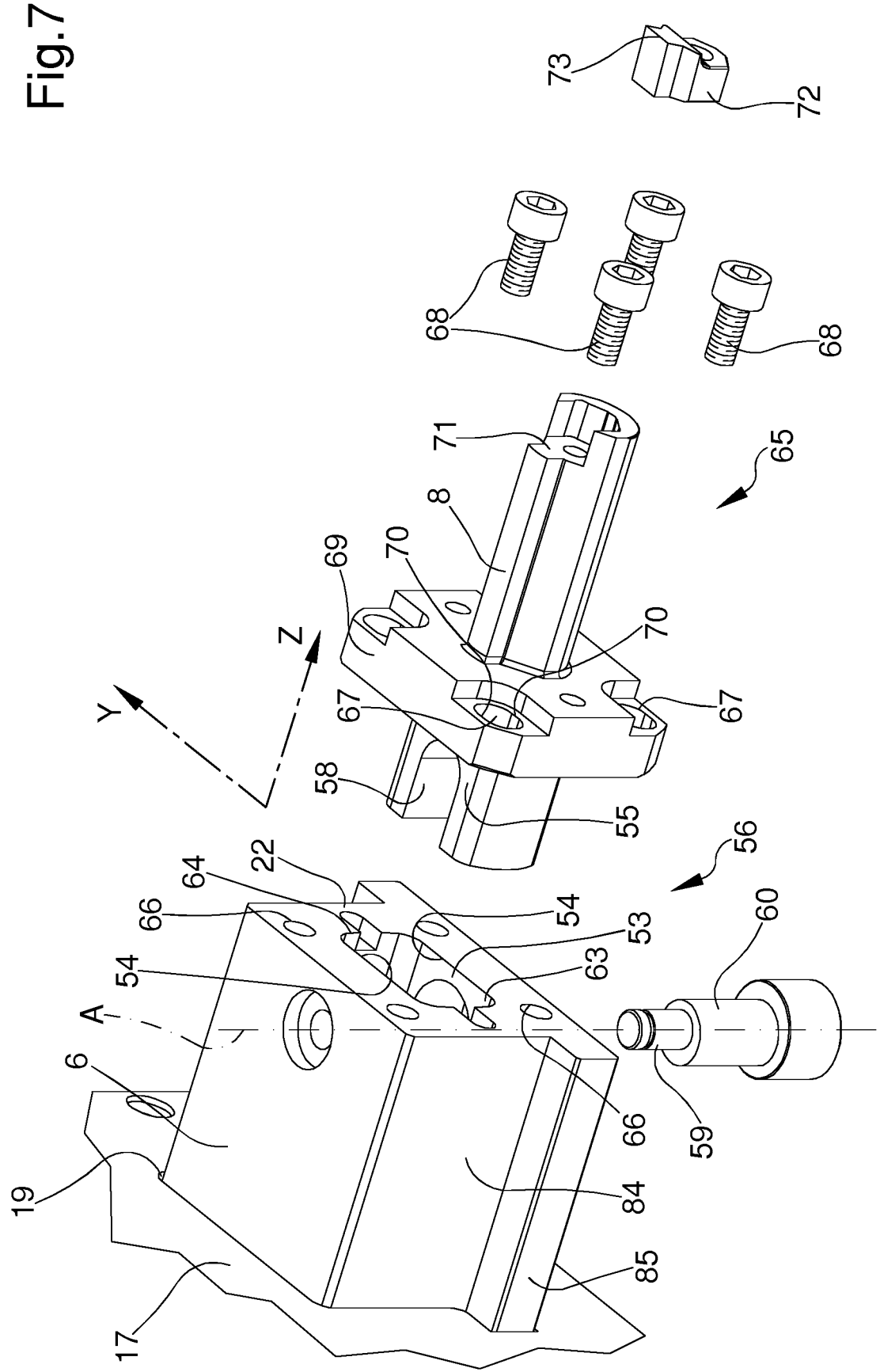
FIG. 7 is an exploded view of some components of the device according to the invention.
Figure 8:
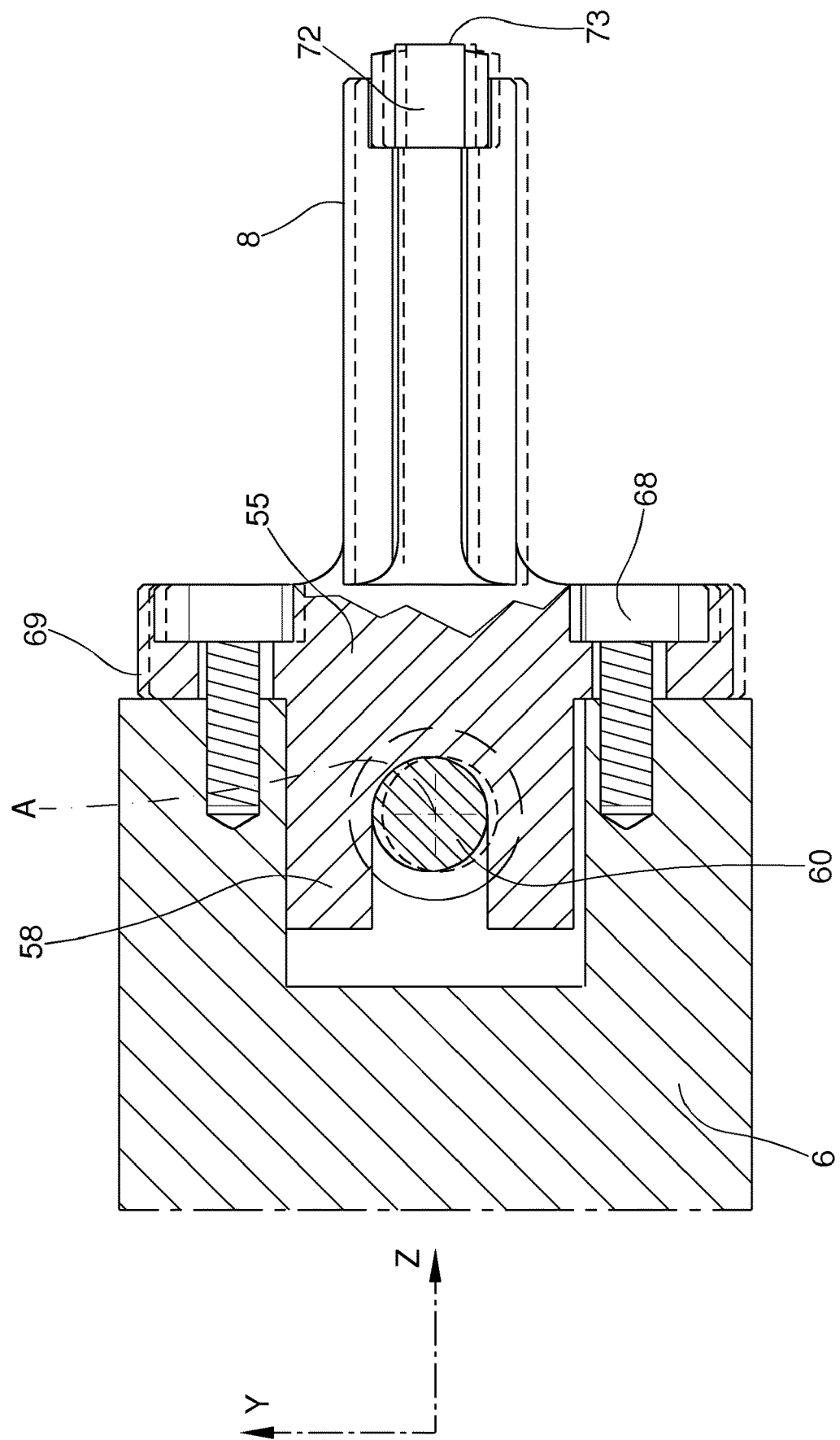
FIG. 8 is a sectional view of some components shown in FIG. 7.

With particular reference to FIG. 7, the insert 72 is provided with a cutting edge 73 arranged substantially parallel to the second axis Y adapted to remove shavings to make the keyway 52 axially to the workpiece 4.

In particular, to adjust the position of the tool 8 with respect to the second axis Y, the threaded stems 68 must be at least partially unscrewed.

This way, the flat abutment portion 69 of the tool 8 is at least partially released from the supporting bar 6 and is free to slide along the front face 22.

In fact, if the eccentric body 57 is rotated, the off-center portion 60 rotates inside the fork 58 and moves the sliding body 55 along the straight edges of the housing 53 between the end-of-stroke edges 64.

Likewise, the straight sides 70 of the slots 67 slide in support along the threaded stems 68 and the tool 8 moves substantially along the second axis Y.

More specifically, the maximum displacement of the tool 8 along the second axis Y is 4 mm.

Finally, after adjusting the position of the tool 8, the threaded stems 68 are screwed back inside the threaded seats 66 to fix the tool 8 to the supporting bar 6 in the desired position to make the keyway 52.

With particular reference to FIG. 3, the correction displacement 83 is shown along the second axis Y through the use of straight adjustment means 24.

In FIG. 3, the correction displacement 83 is intentionally represented with a disproportionate amplitude compared to the real case for the purpose of making clear the operation of the straight adjustment means 24.

In actual facts, the maximum correction displacement 83 is defined by the distance between the axis of adjustment A and the center of the off-center portion 60 projected on the second axis Y.

This way, the maximum correction displacement 83 is 2 mm in a first direction of correction and 2 mm in a second direction of correction substantially opposite to the first direction of correction.

The terms "first direction of correction" and "second direction of correction" refer to the two substantially opposite directions along the second axis Y with respect to the case in which the distance between the axis of adjustment A and the center of the off-center portion 60 projected on the second axis Y is substantially zero.

The keyway 52 is made by means of the tool 8 moved by the supporting bar 6 along the first axis Z to cut the workpiece 4 by means of the insert 72.

In fact, the device 1 comprises at least one rotor 74 rotating around an operating axis B substantially orthogonal to the first axis Z and to the second axis Y, adapted to move the supporting bar 6 along the first axis Z, alternately in a working direction and in a recovery direction substantially opposite to the working direction.

The rotor 74 comprises at least one lateral wall 75 provided with at least one substantially semicircular working portion 76 having a working radius and with at least one substantially semicircular recovery portion 77 and having a lower recovery radius than the working radius, the working assembly 5 being movable between:

- at least one working configuration in which the rotor 74 rotates with the working portion 76 in contact with the second wedge 26 and the supporting bar 6 slides in the working direction and is rotated in the positive direction of rotation; and
- at least one recovery configuration in which the rotor 74 rotates with the recovery portion 77 in contact with the second wedge 26 and the supporting bar 6 slides in the recovery direction and is rotated in the negative direction of rotation.

The terms "working direction" and "recovery direction" referred to the supporting bar 6 mean the movement of supporting bar 6 along the first axis Z in approach to the workpiece 4 and away from the workpiece 4 respectively.

More specifically, the rotor 74 comprises a lower base 78, substantially circular in shape and provided with a guide bearing 79 adapted to move the supporting bar 6. The guide bearing 79 is rotating around a central axis C substantially parallel to operating axis B and is arranged on the lower base 78 of the rotor 74 radially spaced away with respect to the operating axis B.

More specifically, the working assembly 5 comprises a movement guide 80 excavated inside the supporting bar 6 and comprising two guide walls 81 substantially orthogonal with respect to the first axis Z to contain the guide bearing 79.

In fact, the rotor 74 is housed inside the upper opening 43 of the sleeve 40 through the upper hole 21 of the main frame 2 with the guide bearing 79 inserted inside the movement guide 80 to allow the movement of the supporting bar 6.

Advantageously, the guide bearing 79 is arranged at the junction between the working portion 76 and the recovery portion 77 of the rotor 74.

This way, during the entire travel of the supporting bar 6 in the work direction, the second wedge 26 is in contact with the working portion 76, while on the contrary, during the entire travel of the supporting bar 6 in the recovery direction, the second wedge 26 is in contact with the recovery portion 77.

Moreover, the second wedge 26 comprises at least one bearing 82 rotating around a rolling axis D substantially orthogonal to the first axis Z and to the second axis Y, the bearing 82 being in contact with the lateral wall 75 of the rotor 74.

The bearing 82 is inserted inside a compartment obtained on the second straight face 45 of the second wedge 26 to rotate in contact with the lateral wall 75 of the rotor 74.

In particular, during the movement of the supporting bar 6 to make the keyway 52 on the workpiece 4, the rotor 74 rotates the guide bearing 79 around the operating axis B and keeps the guide bearing 79 sliding inside the movement guide 80 of the supporting bar 6.

In other words, the guide bearing 79 is rigidly rotated around the operating axis B and at the same time rotates around the central axis C to slide along the guide walls 81 of the movement guide 80.

Specifically, the guide bearing 79 slides substantially straight inside the movement guide 80 and at the same time presses against the guide walls 81 to move the supporting bar 6 along the first axis Z alternately in the working direction and in the recovery direction.

Furthermore, when the rotation of the rotor 74 takes place with the working portion 76 in contact with the bearing 82 the second wedge 26 is moved along the second prismatic guide 44 to press against the first wedge 25.

Since the position of the first wedge 25 is fixed along the first prismatic guide 34 by the threaded pin 35, the second wedge 26 slides against the first inclined face 28 of the first wedge 25 substantially towards the lower wall 15.

This way, similarly to what has been described about the inclination of the first axis Z by means of the angular adjustment means 23, the second wedge 26 rotates the sleeve 40 compressing the elastic elements 49 to incline the first axis Z in the positive direction.

Conversely, when the portion of the rotor 74 which rotates in contact with the bearing 82 passes from the working portion 76 to the recovery portion 77, the elastic elements 49 are free to discharge at least part of the accumulated elastic energy and rotate the sleeve 40 to incline the first axis Z in the negative direction.

In fact, the sleeve 40 in turn presses the second wedge 26 to slide on the first inclined face 28 of the first wedge 25 substantially towards the upper wall 14 to remain in contact with the rotor 74.

This mechanism allows the cutting edge 73 of the insert 72 to remain in contact with the body of the workpiece 4 while it slides along the work direction, vice versa, slightly inclines the first axis Z during the sliding of the tool 8 along the recovery direction to move the cutting edge 73 away from the body of the workpiece 4.

In fact, the cutting edge 73 cuts the workpiece 4 effectively only during sliding in the work direction, whereas it will be damaged if dragged in contact with the workpiece 4 during sliding in the return direction.

It has in practice been ascertained that the described invention achieves the objects and allows a practical and quick adjustment of the device for the correction of errors made in making the keyway on the workpiece.

More specifically, the device guarantees two degrees of adjustment through the use of angular adjustment means and straight adjustment means which permit correcting an error in the inclination of the first axis Z and an error in the positioning of the first axis Z substantially along the second axis Y respectively.

Moreover, the device allows making the keyway minimizing the wear of the insert used to machine the workpiece.

The invention claimed is:

1. A tool holder device for broaching and slotting, comprising:
   at least one main frame associated with at least one machine, which at least one machine is adapted to machine at least one workpiece; said at least one main frame comprising a container with a substantially rectangular section, the substantially rectangular section comprising: an upper wall; a lower wall that is substantially opposite and substantially parallel to said upper wall; and two lateral walls that are substantially orthogonal to said upper wall, wherein the two lateral walls are substantially opposite to each other and substantially parallel to each other;

at least one working assembly associated with said at least one main frame and comprising at least one supporting bar protruding, in a direction toward the at least one workpiece, from the at least one main frame in a longitudinal direction of the at least one supporting bar, the at least one supporting bar being movable in the longitudinal direction of the at least one supporting bar, in the direction of a first axis, and the at least one working assembly further comprising guiding means for movably guiding said at least one supporting bar in the direction of said first axis;

at least one tool associated with said at least one supporting bar and adapted to machine said at least one workpiece;

wherein said device comprises:

angular adjustment means for adjusting said at least one supporting bar, interposed between said at least one main frame and said guiding means, the angular adjustment means being adapted to rotate said at least one supporting bar around a second axis substantially orthogonal with respect to said first axis.

2. The device according to claim 1, wherein said angular adjustment means comprise:

at least one pair of wedges coupled to each other, of which a first wedge is associated with said at least one main frame and of which a second wedge is associated with said guiding means;

movement means for said at least one pair of wedges adapted to push said first wedge and said second wedge against each other to tilt said at least one supporting bar around said second axis along a positive direction of rotation.

3. The device according to claim 2, wherein:

said angular adjustment means comprise at least one balancing assembly for balancing said at least one working assembly, wherein said at least one working assembly is interposed between said at least one main frame and said guiding means, said at least one balancing assembly being adapted to rotate said at least one supporting bar around said second axis along a negative direction of rotation opposite to said positive direction of rotation;

said guiding means comprise at least one sleeve fitting around said at least one supporting bar, said second wedge being associated with said at least one sleeve, and wherein said at least one balancing assembly is interposed between said at least one sleeve and said at least one main frame.

4. The device according to claim 3, wherein said at least one balancing assembly comprises at least one elastic element interposed between said at least one main frame and said at least one sleeve and pre-charged to tilt said at least one sleeve into said negative direction of rotation.

5. The device according to claim 2, wherein said first wedge is associated with said at least one main frame in a manner so as to allow movement of said first wedge such that the first wedge presses against said second wedge.

6. The device according to claim 2, wherein said movement means comprise a threaded pin screwable to said at least one main frame, said threaded pin being associated with said first wedge.

7. The device according to claim 2, wherein said second wedge is associated with said guiding means to allow movement of said second wedge with respect to said guiding means.

8. The device-according to claim 2, wherein said device comprises at least one rotor rotating around an axis of actuation substantially orthogonal to said first axis and to said second axis, adapted to move said at least one supporting bar along said first axis, alternately in a working direction and in a recovery direction substantially opposite to said working direction, and with the at least one rotor comprising at least one lateral wall, with the at least one lateral wall having at least one substantially semicircular working portion having a working radius, and with the at least one lateral wall having at least one substantially semicircular recovery portion having a recovery radius, wherein the recovery radius is smaller than said working radius, said at least one working assembly being movable between:

at least one working configuration in which said at least one rotor rotates with said at least one substantially semicircular working portion in contact with said second wedge and in which said at least one supporting bar slides in said working direction and is rotated in said positive direction of rotation; and at least one recovery configuration in which said at least one rotor rotates with said at least one substantially semicircular recovery portion in contact with said second wedge and in which said at least one supporting bar slides in said recovery direction and is rotated in-a negative direction of rotation.

9. The device-according to claim 8, wherein said second wedge comprises at least one bearing rotating around a rolling axis substantially orthogonal to said first axis and to said second axis, said at least one bearing being in contact with said at least one lateral wall of said at least one rotor.

10. The device according to claim 1, wherein said angular adjustment means comprise at least one balancing assembly for balancing said at least one working assembly, wherein said at least one working assembly is interposed between said at least one main frame and said guiding means, said at least one balancing assembly being adapted to rotate said at least one supporting bar around said second axis along a negative direction of rotation opposite to a positive direction of rotation.

11. The device-according to claim 1, wherein said at least one tool comprises at least one cavity in which at least one machining insert for machining said at least one workpiece is accommodated.

12. The device according to claim 1, wherein the device further comprises straight adjustment means for adjusting said at least one tool with respect to said at least one supporting bar, interposed between said at least one tool and said at least one supporting bar, said straight adjustment means being adapted to adjust the position of said at least one tool along said second axis.

13. The device according to claim 12, wherein said straight adjustment means comprise:

at least one housing formed in said at least one supporting bar and comprising a pair of straight guiding edges substantially parallel to each other and substantially parallel to said second axis;

at least one sliding body to be accommodated inside said at least one housing and guided in contact with said pair of straight guiding edges to slide along said second axis, said at least one sliding body being associated with said at least one tool;

activation means for activating the sliding of said at least one sliding body, with the activation means being interposed between said at least one supporting bar and said at least one tool, said activation means activating a sliding of said at least one tool along said second axis.

14. The device-according to claim 13, wherein said activation means comprise:
   at least one eccentric body, rotating around, and having a portion that is eccentric with respect to, an axis of adjustment substantially orthogonal to said first axis and to said second axis, said at least one eccentric body being accommodated inside said at least one housing;
   at least one fork formed on said at least one sliding body and inserted inside said at least one housing astride of said at least one eccentric body, the rotation of said at least one eccentric body around said axis of adjustment being adapted to cause said at least one fork, said at least one sliding body and said at least one tool to slide along said second axis.

15. The device according to claim 12, wherein said straight adjustment means comprise temporary fixing means for fixing said at least one tool onto said at least one supporting bar.

16. The device-according to claim 15, wherein said temporary fixing means comprise:
   at least one threaded seat formed on said at least one supporting bar;
   at least one slot formed passing through said at least one tool and at least partly elongated along said second axis;
   at least one threaded stem screwable inside said at least one threaded seat through said at least one slot.

* * * * *